(12) United States Patent
Xu

(10) Patent No.: US 12,177,883 B2
(45) Date of Patent: Dec. 24, 2024

(54) SIGNAL TRANSMISSION METHOD AND APPARATUS, MOBILE TERMINAL, AND STORAGE MEDIUM

(71) Applicant: GUANGDONG OPPO MOBILE TELECOMMUNICATIONS CORP., LTD., Guangdong (CN)

(72) Inventor: Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 365 days.

(21) Appl. No.: 17/706,514

(22) Filed: Mar. 28, 2022

(65) Prior Publication Data

US 2022/0225340 A1    Jul. 14, 2022

Related U.S. Application Data

(63) Continuation of application No. PCT/CN2019/116398, filed on Nov. 7, 2019.

(51) Int. Cl.
  *H04W 72/21* (2023.01)
  *H04W 72/56* (2023.01)
(52) U.S. Cl.
  CPC ........... *H04W 72/56* (2023.01); *H04W 72/21* (2023.01)
(58) Field of Classification Search
  CPC ... H04W 72/56; H04W 72/21; H04W 72/569; H04W 72/0446; H04W 72/0453; H04W 72/23
  See application file for complete search history.

(56) References Cited

U.S. PATENT DOCUMENTS

2019/0045546 A1\* 2/2019 Li ........................ H04L 5/0073
2019/0327755 A1 10/2019 Xiong et al.
(Continued)

FOREIGN PATENT DOCUMENTS

CA     3065623 A1   12/2018
CN   108809583 A    11/2018
(Continued)

OTHER PUBLICATIONS

Mitsubishi ("Views on pre-emption for UL inter/intra UE Tx multiplexing", 3GPP Draft; R1-1900639-AH1_URLLC_MITBS, Jan. 2019).\*

(Continued)

*Primary Examiner* — Lakeram Jangbahadur
(74) *Attorney, Agent, or Firm* — Ladas & Parry, LLP

(57) ABSTRACT

Disclosed in embodiments of the present application are signal transmission method and apparatus, mobile terminal, and storage medium. The method includes: acquiring transmission configuration information of a first service signal, where the transmission configuration information includes a first time-frequency resource allocated to the first service signal; receiving resource indication information, where the resource indication information is used to indicate a second time-frequency resource in which transmission of a second service signal exists; and if it is determined, according to the transmission configuration information and the resource indication information, to interrupt transmission of the first service signal in the first time-frequency resource, determining a starting position and/or an ending position at which the transmission of the first service signal is interrupted. With the aforementioned manner, it is achieved that usage efficiency of signal transmission resources is improved as much as possible on the premise that signal transmission can be stably performed.

3 Claims, 9 Drawing Sheets

(56) References Cited

U.S. PATENT DOCUMENTS

| | | | | |
|---|---|---|---|---|
| 2021/0321386 | A1* | 10/2021 | Feng | .................. H04W 76/10 |
| 2023/0046108 | A1* | 2/2023 | Wu | .................. H04W 36/304 |

FOREIGN PATENT DOCUMENTS

| | | | | |
|---|---|---|---|---|
| CN | 109152077 | A | | 1/2019 |
| CN | 109392097 | A | | 2/2019 |
| CN | 109451853 | A | | 3/2019 |
| CN | 109547170 | A | | 3/2019 |
| CN | 109963335 | A | | 7/2019 |
| CN | 110011714 | A | | 7/2019 |
| CN | 110035531 | A | | 7/2019 |
| WO | 2018095097 | A1 | | 5/2018 |
| WO | 2019098697 | A1 | | 5/2019 |
| WO | WO-2019120303 | A1 | * | 6/2019 .............. H04L 5/00 |
| WO | 2021087909 | A1 | | 5/2021 |

OTHER PUBLICATIONS

Vivo, "Summary of handling UL multiplexing of transmission with different",3GPP TSG RAN WG1 Meeting #92bis, R1-1805629, Sanya, China, Apr. 16-20, 2018, entire document.
ZTE, On Inter-UE multiplexing between eMBB and URLLC, 3GPP TSG RAN WG1 Meeting #94, R1-1808212, Gothenburg, Sweden, Aug. 20-24, 2018, entire document.
Mitsubishi Electric, "Views on pre-emption for UL inter/intra UE Tx multiplexing", 3GPP TSG RAN WG1 Ad-Hoc Meeting, R1-1900639, Taipei, Taiwan, Jan. 21-25, 2019, entire document.
ZTE, "UL control enhancements for NR URLLC" 3GPP TSG RAN WG1 #98 , R1-1908236, Prague, CZ, Aug. 26-30, 2019, entire document.
Extended European Search Report for European Application No. 19951466.2 issued on Jul. 7, 2022.
Written Opinion of the International Searching Authority dated Jul. 29, 2020 for Application No. PCT/CN2019/116398 (previously cited in IDS on Mar. 28, 2022 with Google translation, now cited with translation from WIPO patentscope).
MCC Support. 3GPP TSG RAN WG1 Meeting #99 R1-1913275; Final Report of 3GPP TSG RAN WG1 #98bis v2.0.0 (Chongqing, China, Oct. 14-20, 2019), Reno, USA, Nov. 18-22, 2019, entire document.
International Search Report (ISR) dated Jul. 29, 2020 for Application No. PCT/CN2019/116398.
Written Opinion of the International Searching Authority in International Application No. PCT/CN2019/116398 dated Jul. 29, 2020, with English translation provided by Google Translate.
The first Office Action of corresponding European application No. 19951466.2, dated Mar. 17, 2023.
The third Office Action of corresponding Chinese application No. 202210507534.8, dated Dec. 29, 2023.
The Decision of Rejection of corresponding Chinese application No. 202210507534.8, dated Mar. 8, 2024.
The second Office Action of corresponding European application No. 19951466.2, dated Feb. 8, 2024.
The first Office Action and search report of corresponding Chinese patent application No. 202210507534.8, dated Jun. 16, 2023.
The second Office Action of corresponding Chinese patent application No. 202210507534.8, dated Sep. 1, 2023.
The second Office Action of corresponding European patent application No. 19951466.2, dated Aug. 22, 2023.

* cited by examiner

SIGNAL TRANSMISSION METHOD AND APPARATUS, MOBILE TERMINAL, AND STORAGE MEDIUM

CROSS-REFERENCE TO RELATED APPLICATIONS

The present application is a continuation of International Application No. PCT/CN2019/116398, filed on Nov. 7, 2019, which is incorporated herein by reference in its entirety.

TECHNICAL FIELD

The present application relates to the field of communication technologies, and in particular, to a signal transmission method and apparatus, a mobile terminal, and a storage medium.

RELATED ARTS

A variety of services have been introduced in a current 5G (NR, new radio) system, while there may be a resource conflict between different services. However, during a relevant service transmission process, the conflict between different services cannot be effectively resolved.

SUMMARY

In view of the above problem, proposed in the present application are a signal transmission method and apparatus, a mobile terminal and a storage medium to ameliorate the aforementioned problem.

In a first aspect, the present application provides a signal transmission method applied to a mobile terminal, including: acquiring transmission configuration information of a first service signal, where the transmission configuration information includes a first time-frequency resource allocated to the first service signal; receiving resource indication information, where the resource indication information is used to indicate a second time-frequency resource in which transmission of a second service signal exists; and if it is determined, according to the transmission configuration information and the resource indication information, to interrupt transmission of the first service signal in the first time-frequency resource, determining a starting position and/or an ending position at which the transmission of the first service signal is interrupted.

In a second aspect, the present application provides a signal transmission apparatus, including: a configuration acquiring unit, configured to acquire transmission configuration information of a first service signal, where the transmission configuration information includes a first time-frequency resource allocated to the first service signal; a resource occupancy determining unit, configured to receive resource indication information, where the resource indication information is used to indicate a second time-frequency resource in which transmission of a second service signal exists; and an interruption position determining unit, configured to: if it is determined, according to the transmission configuration information and the resource indication information, to interrupt transmission of the first service signal in the first time-frequency resource, determine a starting position and/or an ending position at which the transmission of the first service signal is interrupted.

In a third aspect, the present application provides a mobile terminal, including: one or more processors and a memory; where one or more programs are stored in the memory and configured to be executable by the one or more processors, and the one or more programs are configured to execute the aforementioned method.

In a fourth aspect, the present application provides a computer-readable storage medium, including: a program that is stored, where when the program is run by a processor, the aforementioned method is executed.

The signal transmission method and apparatus, the mobile terminal, and the storage medium provided in the present application can allow for: acquiring transmission configuration information of a first service signal, where the transmission configuration information includes a first time-frequency resource allocated to the first service signal; and then when receiving resource indication information representing occupancy of a signal transmission resource by a device other than the mobile terminal, if it is determined, according to the transmission configuration information and the resource indication information, to interrupt transmission of the first service signal in the first time-frequency resource, determining a starting position and/or an ending position at which the transmission of the first service signal is interrupted. With the aforementioned manner, it is achieved that, the first time-frequency resource of the first service signal to be transmitted is acquired, and then the starting position and/or the ending position at which the transmission of the first service signal is interrupted in the first time-frequency resource is further determined according to the received resource indication information, thereby achieving that usage efficiency of signal transmission resources is improved as much as possible on the premise that signal transmission can be stably performed.

BRIEF DESCRIPTION OF DRAWINGS

In order to more clearly illustrate technical solutions in embodiments of the present application, accompanying figures required to be used for description of the embodiments will be briefly introduced hereunder. It is obvious that the figures in the following description are merely some embodiments of the present application, a person skilled in the art can also obtain other figures according to these figures without the premise of paying any creative effort.

DESCRIPTION OF EMBODIMENTS

Technical solutions in embodiments of the present application will be clearly and comprehensively described hereunder in conjunction with the accompanying figures of the embodiments of the present application. It is obvious that the described embodiments are merely a part of the embodiments of the present application, rather than all embodiments of the present application. All other embodiments obtained by those of ordinary skill in the art based on the embodiments of the present application without the premise of paying any creative effort should fall into the protection scope of the present application.

With the development of communication technologies, a variety of services have been introduced in a 5G (NR, new radio) system, such as both a URLLC (Ultra-reliable low latency communication) service and an eMBB (Enhanced Mobile Broadband) service. However, for different services, signal transmission characteristics thereof are distinct. Taking the URLLC service and the eMBB service as an example, the URLLC service is characterized by achieving ultra-high reliability (e.g., 99.999%) transmission within a short delay (e.g., 1 ms), and the eMBB service is characterized by being insensitivity to delay but with possibly a large number of transmissions.

However, the inventor has found, in research on a scenario within which multiple services coexist, that occurrence of occupancy of a signal transmission resource might cause a service conflict when multiple services coexist. For example, for both the URLLC service and the eMBB service, in order to achieve URLLC instantaneous transmission, there will be a conflict between URLLC and eMBB, that is, the URLLC occupies a signal transmission resource that has been allocated to the eMBB, which in turn will cause a conflict between URLLC and eMBB transmission to incur mutual interference therebetween, thereby impacting demodulation performances of URLLC and eMBB.

Therefore, the inventor proposes the signal transmission method, the mobile terminal and apparatus, and the storage medium in the present application. With the manner provided in the present application, it is achieved that, after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed.

An introduction will first be made hereunder with regard to an application environment involved in a signal transmission method provide in the present application.

Figure 1:
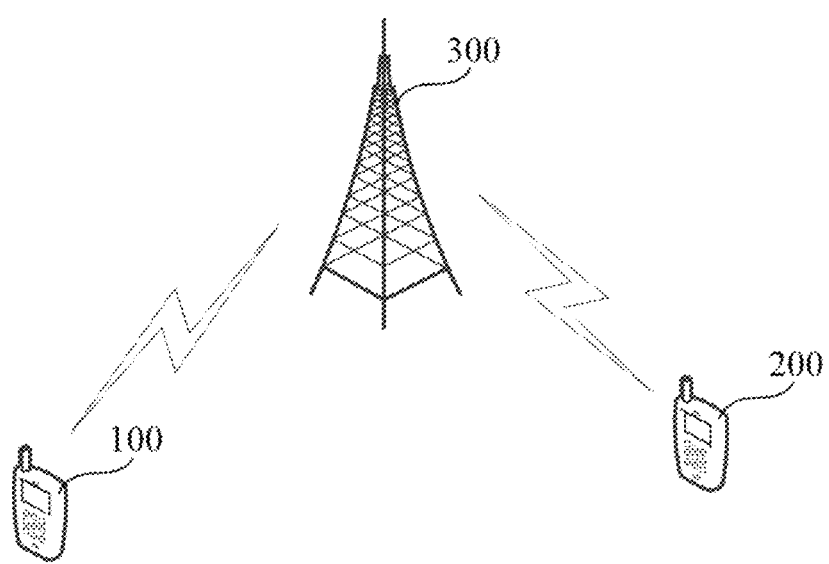
FIG. 1 shows a schematic diagram of an application environment of a signal transmission method proposed in an embodiment of the present application.

As shown in FIG. 1, the application scenario involved includes a mobile terminal 100, a mobile terminal 200, and a base station 300. Among them, when the mobile terminal 100 is about to perform a service signal transmission with the base station 300, the base station may transmit transmission configuration information which is configured corresponding to the service signal to be transmitted, and then the mobile terminal 100 may acquire, from the transmission configuration information, a time-frequency resource allocated to the service signal. In one situation, the mobile terminal 200 may also apply for a service signal transmission with the base station 300 when the mobile terminal 100 is about to transmit or is transmitting a service signal. Similarly, the base station 300 may also transmit transmission configuration information of the service signal to be transmitted by the mobile terminal 200 to the mobile terminal 200, and then the mobile terminal 200 determines a time-frequency resource allocated to the service signal to be transmitted by the mobile terminal 200 with the base station 300.

After the mobile terminal 200 determines the time-frequency resource of the service signal to be transmitted, the base station 300 may generate resource indication information based on the time-frequency resource, and transmit the resource indication information to the mobile terminal 100, so that the mobile terminal 100 may determine, according to the received transmission configuration information and the resource indication information, a starting position and/or an ending position at which the transmission of the first service signal is interrupted in the first time-frequency resource, so that usage efficiency of signal transmission resources is improved as much as possible on the premise that signal transmission can be stably performed.

It should be noted that the aforementioned environment is an exemplary scenario in which the number of mobile terminals and base stations may not be limited to the number shown in the figure, and in which mutual communication between mobile terminals may also not be limited to being performed via the base station, instead two or more mobile terminals may also directly communicate with each other.

Main technical content involved in the embodiments of the present application will be illustrated hereunder.

URLLC (Ultra-reliable low latency communication): an abbreviation for ultra-reliable low latency communication, which is characterized by high reliability, low delay, and extremely high availability.

eMBB (Enhanced Mobile Broadband): an abbreviation for enhanced mobile broadband, which refers to further improvements of performances such as user experience on the basis of the existing mobile broadband service scenario, mainly in pursuit of the ultimate communication experience among people. As its name implies, the eMMB is a technology dedicated to serving mobile devices such as mobile phones.

PUSCH (Physical Uplink Shared Channel): an abbreviation for physical uplink shared channel, which is used to transfer uplink data in addition to control information. Generally, it is medially located in a frequency band and occupies a vast majority of resources.

PUCCH (Physical Uplink Control Channel): an abbreviation for physical uplink control channel, which is mainly used to transfer control information upward. Generally, it is located at both ends of a frequency band and occupies a minority of resources.

Figure 2:
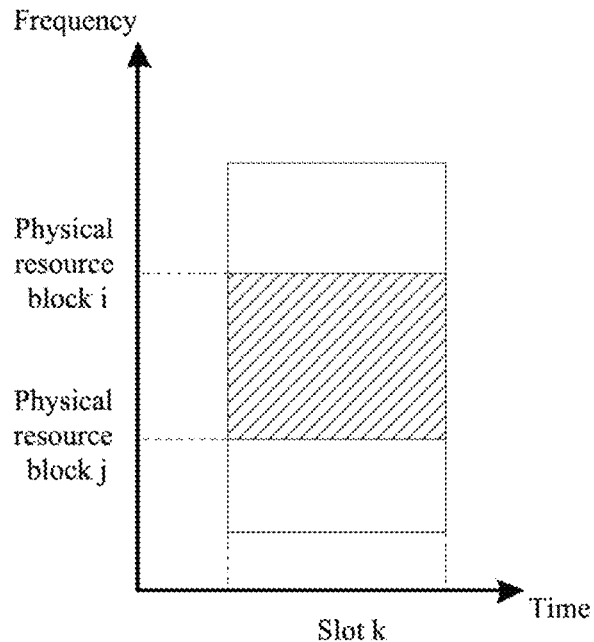
FIG. 2 shows a schematic diagram of time-frequency resources proposed in an embodiment of the present application.

Time-frequency resource: a time-frequency resource may be interpreted as a frequency band required to be used for transmitting a service signal within a certain slot. That is to say, in respect of a time-frequency resource, it has a two-dimensional characteristic in both a time domain dimension and a frequency domain dimension. With reference to FIG. 2, when a mobile terminal needs to perform a service transmission, a time-frequency resource allocated by a base station in a time domain is a slot k, and in a frequency domain is a frequency band from a physical resource block j to a physical resource block i. In other words, for the mobile terminal, the time-frequency resource allocated by the base station is the shaded part in FIG. 2.

Hereinafter, various embodiments of the present application will be described in detail in conjunction with the accompanying figures.

Figure 3:
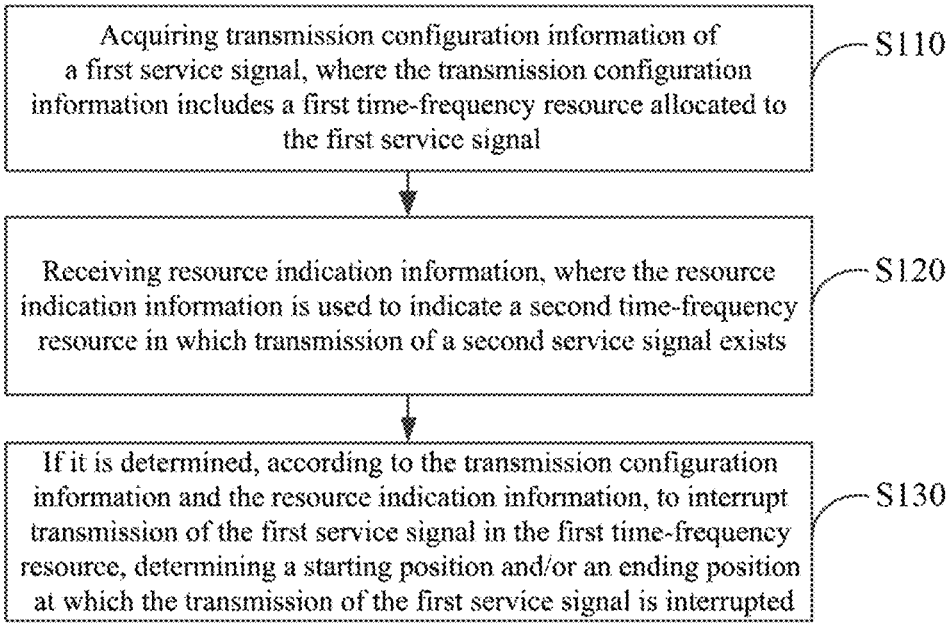
FIG. 3 shows a flowchart of a signal transmission method proposed in an embodiment of the present application.

Reference may be made to FIG. 3, where the present application provides a signal transmission method applied to a mobile terminal, including:

S110: acquiring transmission configuration information of a first service signal, where the transmission configuration information includes a first time-frequency resource allocated to the first service signal.

It should be noted that the first service signal may be interpreted as a service signal to be transmitted by a mobile terminal. In a base station-based service transmission mode, before performing a service transmission, the mobile terminal needs to apply to a base station for a signal transmission resource required for signal transmission. Correspondingly, after receiving a request indicating that the mobile terminal desires to transmit the first service signal, the base station may determine transmission configuration information including a time-frequency resource allocated to the first service signal. Among them, the time-frequency resource for the first service signal can be determined according to the first service signal. As shown in the foregoing content, the time-frequency resource may be interpreted as a frequency band required to be used for transmitting a service signal within a certain slot, then the first time-frequency resource here may be interpreted as a signal transmission resource, allocated by the base station to the first service signal, required for signal transmission.

Figure 4:
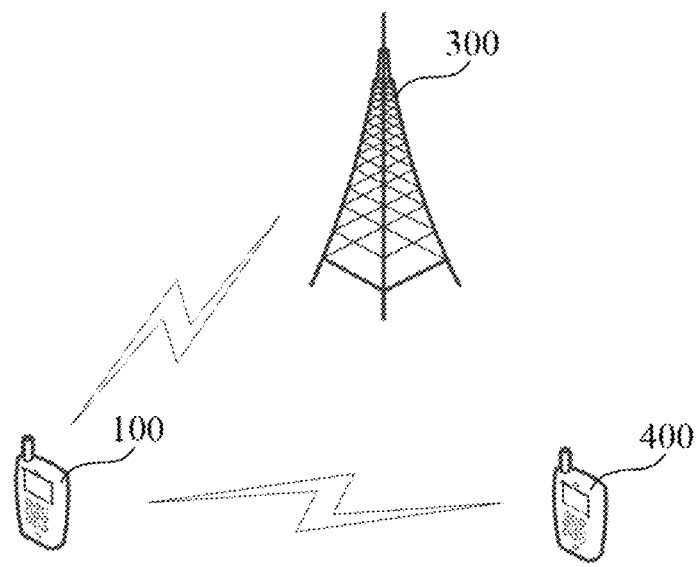
FIG. 4 shows a schematic diagram of an application environment of another signal transmission method proposed in an embodiment of the present application.

In another mode, the mobile terminal may perform a service signal transmission without resorting to the base station. For example, in a sidelink scenario, the mobile terminal may perform a service signal transmission directly with a further terminal device. In cellular Internet of Things technologies, there is also an important branch, known as Device to Device Communication (device to device communication technology), and a scenario applicable to the device to device communication technology may be interpreted as a sidelink scenario. In this mode, the first service signal may still be interpreted as a service signal to be transmitted by the mobile terminal, and transmission configuration information including a time-frequency resource allocated to the first service signal can be determined by the mobile terminal itself, or can be determined by a further communication terminal that performs transmission of the first service signal with the mobile terminal. As shown in FIG. 4, the service signal transmission between the mobile terminal 100 and a mobile terminal 400 involved in FIG. 4 may be interpreted as a service signal transmission in the sidelink scenario.

In yet another mode, the mobile terminal may perform wireless communications with a further terminal by means of an intermediate network device. Exemplarily, the intermediate network device may be a device such as a gateway. Then in this situation, transmission configuration information including a time-frequency resource allocated to the first service signal can be determined by the intermediate network device, and further a first time-frequency resource of the first service signal to be transmitted by the mobile terminal is determined according to the transmission configuration information.

It should be noted that the first time-frequency resources determined in the foregoing various modes are similar in nature, that is, each of them may be interpreted as a frequency band required to be used for transmitting a service signal within a certain slot. The difference lies in that: in the mode where the first service signal transmission is performed based on the base station, the determined first time-frequency resource is a time-frequency resource required for the first service signal transmission between the mobile terminal and the base station; in the mode where mobile terminals directly communicate with each other, the determined first time-frequency resource is a time-frequency resource required for the first service signal transmission between the mobile terminals; and in the mode where the mobile terminal may perform wireless communications with a further terminal by means of an intermediate network device, the determined first time-frequency resource is a time-frequency resource required for the first service signal transmission between the mobile terminal and the intermediate network device.

In the present embodiment, in addition to the first time-frequency resource, the transmission configuration information may also include at least one of: a service priority, a service type, and a channel type. In an implementation, the transmission configuration information may also simultaneously include a service priority, a service type, and a channel type.

S120: receiving resource indication information, where the resource indication information is used to indicate a second time-frequency resource in which transmission of a second service signal exists.

It should be noted that, during a service signal transmission progress, the mobile terminal needs a signal transmission resource such as a frequency band to carry the transmitted service signal. Different mobile terminals or different services may require different signal transmission resources. Then, in order that it may be convenient for the mobile terminal to timely determine which signal transmission resources are currently occupied, a peer side in communication with the mobile terminal may generate resource indication information and transmit the generated resource indication information to the mobile terminal.

As a manner, in the mode where the mobile terminal performs a service signal transmission through the base station, multiple mobile terminals may access the same base station, then the base station may configure different time-frequency resources respectively for the multiple mobile terminals. Further, the base station may synchronize, in the form of resource indication information, the time-frequency resources configured for different mobile terminals to a mobile terminal currently accessing the base station. Among them, the time-frequency resources allocated by the base station to the different mobile terminals may be interpreted as time-frequency resources allocated by the base station to service signals required to be transmitted by the different mobile terminals. Then, after the mobile terminal accessing the base station receives the resource indication information, occupancy of a signal transmission resource of the base station currently being accessed can be determined from the resource indication information. For example, a second time-frequency resource indicating that transmission of a second service signal exists may be acquired. It should be noted that, in an implementation, the time-frequency resource allocated to the second service signal is greater than or equal to the second time-frequency resource.

As another manner, in addition to being transmitted by different mobile terminals respectively, the aforementioned first service signal and second service signal may also be transmitted by a same mobile terminal. That is, it is understandable that the first service signal and the second service signal may be initiated by different mobile terminals respectively, or may be initiated by a same mobile terminal.

Similarly, in the mode where multiple mobile terminals directly perform a service signal transmission with each other, resource indication information may be generated by a terminal device other than the mobile terminal that executes the signal transmission method provided in the embodiment of the present application, and the generated resource indication information is transmitted to the mobile terminal that executes the signal transmission method provided in the embodiment of the present application. In the mode where the mobile terminal performs a service signal transmission through an intermediate network device, resource indication information may be generated by the intermediate network device and synchronized to a mobile terminal that currently has an established connection with the intermediate network device.

S130: if it is determined, according to the transmission configuration information and the resource indication information, to interrupt transmission of the first service signal in the first time-frequency resource, determining a starting position and/or an ending position at which the transmission of the first service signal is interrupted.

It is understandable that after receiving the resource indication information, the mobile terminal may learn, through the resource indication information, occupancy of a current signal transmission resource and which services specifically occupy the signal transmission resource, and then decide whether there is a conflict between a time-frequency resource of a further service signal and the time-frequency resource of the first service signal transmitted by the mobile station itself. As a manner, whether to interrupt transmission of the first service signal in the first time-frequency resource can be determined according to the transmission configuration information and the resource indication information.

If a conflict is detected, a starting position and/or an ending position at which the transmission of the first service signal is interrupted in the first time-frequency resource can further be determined.

Figure 5:
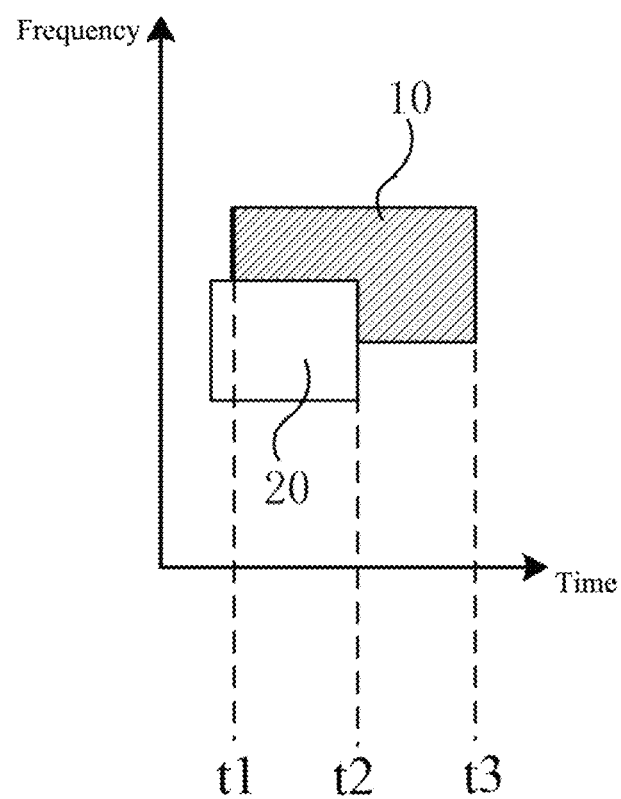
FIG. 5 shows a schematic diagram of a resource conflict in a signal transmission method proposed in an embodiment of the present application.
Figure 6:
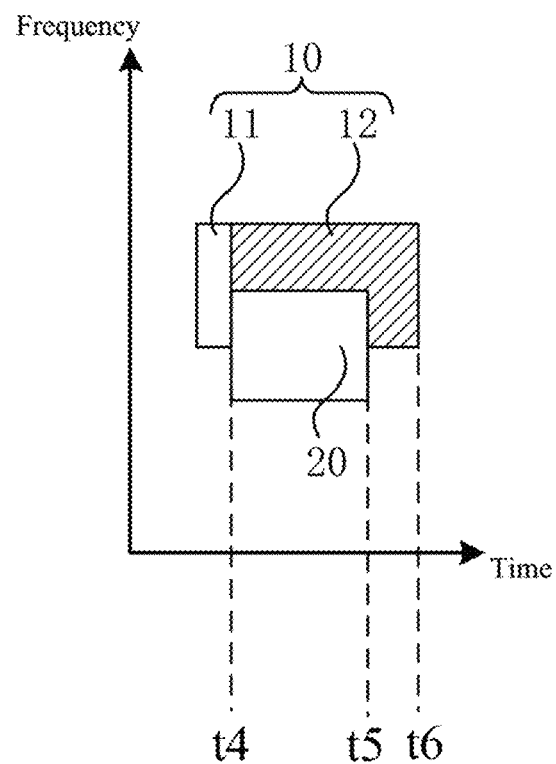
FIG. 6 shows a schematic diagram of another resource conflict in a signal transmission method proposed in an embodiment of the present application.
Figure 7:
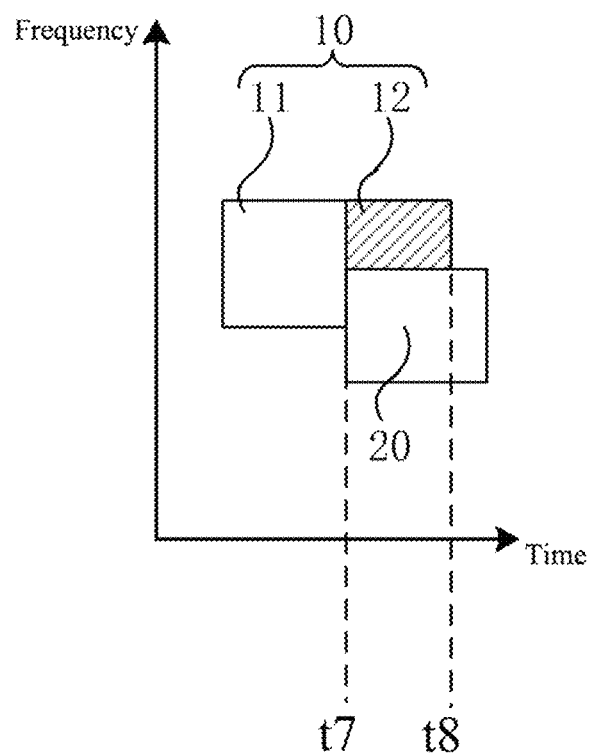
FIG. 7 shows a schematic diagram of yet another resource conflict in a signal transmission method proposed in an embodiment of the present application.

Exemplarily, reference may be made to FIG. 5-FIG. 7, where a variety of signal interruption modes are shown respectively.

As shown in FIG. 5, in the mode shown in FIG. 5, a resource conflict between a time-frequency resource 20 of a further service signal and a time-frequency resource 10 of the first service signal starts at the beginning of the transmission of the first service signal (that is, a timing t1 in the figure), and the conflict ends at a timing before an original ending position of the first service signal (that is, a timing t2 in the figure). Among them, the ending position may be interpreted as a temporal position at which the transmission of the first service signal represented in the first time-frequency resource of the first service signal is originally ended. In this situation, interrupting the transmission of the first service signal starts from a starting position (that is, the timing t1) of the resource conflict, and ends at the original ending position (that is, a timing t3) of the transmission of the first service signal. In this manner, it is understandable that the first service signal will not be transmitted.

As shown in FIG. 6, in the mode shown in FIG. 6, a resource conflict between a time-frequency resource 20 of a further service signal and a time-frequency resource 10 of the first service signal starts at a time during transmission of the first service signal (that is, a timing t4 in the figure), and the conflict ends at a timing before an original ending position of the first service signal (that is, a timing t5 in the figure). In this situation, interrupting the transmission of the first service signal starts from a starting position (that is, the timing t4) of the resource conflict, and ends at the original ending position (that is, a timing t6) of the transmission of the first service signal. In this manner, it is understandable that a portion of the first service signal corresponding to a time-frequency resource 11 will be transmitted while a portion thereof corresponding to a time-frequency resource 12 will not be transmitted.

As shown in FIG. 7, in the mode shown in FIG. 7, a resource conflict between a time-frequency resource 20 of a further service signal and a time-frequency resource 10 of the first service signal starts at a time during the transmission of the first service signal (that is, a timing t7 in the figure), and the conflict ends at a timing at an original ending position of the first service signal (that is, a timing t8 in the figure). In this situation, interrupting the transmission of the first service signal starts from a starting position (that is, the timing t7) of the resource conflict, and ends at the original ending position (that is, the timing t8) of the transmission of the first service signal. In this manner, it is understandable that a portion of the first service signal corresponding to a time-frequency resource 11 will be transmitted while a portion thereof corresponding to a time-frequency resource 12 will not be transmitted.

It should be noted that, as a manner, if a transmission-interrupted service signal corresponding to the first service signal is not decoded successfully, the transmission-interrupted service signal will be retransmitted.

The signal transmission method provided in the present application can allows for: acquiring transmission configuration information of a first service signal, where the transmission configuration information includes a first time-frequency resource allocated to the first service signal; and then when receiving resource indication information representing occupancy of a signal transmission resource by a device other than the mobile terminal, if it is determined, according to the transmission configuration information and the resource indication information, to interrupt transmission of the first service signal in the first time-frequency resource, determining a starting position and/or an ending position at which the transmission of the first service signal is interrupted. With the aforementioned manner, it is achieved that, after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed.

Figure 8:
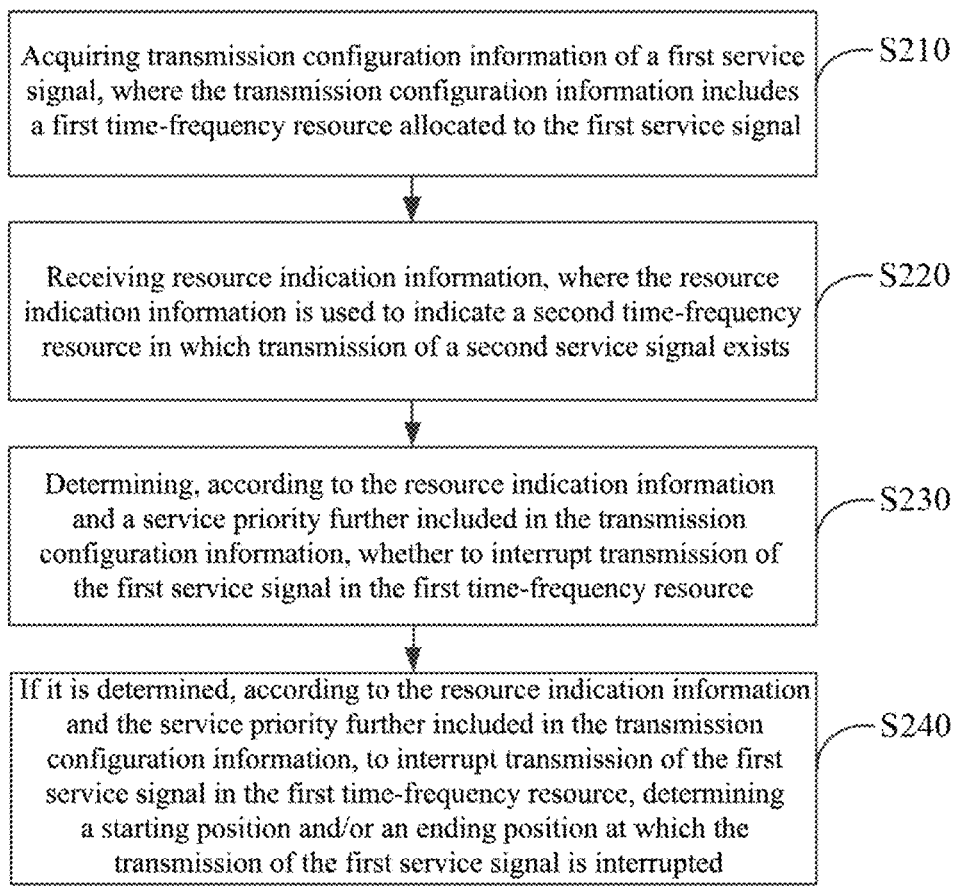
FIG. 8 shows a flowchart of another signal transmission method proposed in an embodiment of the present application.

Reference may be made to FIG. 8, where the present application provides a signal transmission method applied to a mobile terminal, including:

S210: acquiring transmission configuration information of a first service signal, where the transmission configuration information includes a first time-frequency resource allocated to the first service signal.

S220: receiving resource indication information, where the resource indication information is used to indicate a second time-frequency resource in which transmission of a second service signal exists.

S230: determining, according to the resource indication information and a service priority further included in the transmission configuration information, whether to interrupt transmission of the first service signal in the first time-frequency resource.

S240: if it is determined, according to the resource indication information and the service priority further included in the transmission configuration information, to interrupt transmission of the first service signal in the first time-frequency resource, determining a starting position and/or an ending position at which the transmission of the first service signal is interrupted.

It should be noted that different service signals may be configured with different service priorities due to different transmission contents to be realized. Taking both a URLLC service and an eMBB service as an example, the URLLC service is generally applied in a scenario requiring instantaneous transmission, such as an unmanned driving scenario and a real-time VR image transmission scenario. If the instantaneous transmission of the URLLC service cannot be guaranteed, a serious consequence may be incurred. For example, in the unmanned driving scenario, a vehicle needs to transmit traffic information to a cloud side in real time so that a driving decision can be made at the cloud side; if the traffic information cannot be uploaded to the cloud side in time, it may cause the cloud side unable to make a correct driving decision in time. The eMBB service is generally applied in a communication scenario between mobile terminals. Then through the foregoing comparison, in one mode, the URLLC service may be configured to have a service priority higher than a service priority of the eMBB service.

As a manner, the if it is determined, according to the resource indication information and the service priority further included in the transmission configuration information, to interrupt transmission of the first service signal in the first time-frequency resource, determining the starting position and/or the ending position at which the transmission of the first service signal is interrupted includes:

if there is a conflicting resource between the first time-frequency resource and the second time-frequency resource, and the second service signal has a service priority higher than the service priority of the first service signal, determining to interrupt the transmission of the first service signal in the first time-frequency resource; or, if there is no conflicting resource between the first time-frequency resource and the second time-frequency resource, or the second service signal has a service priority lower than or equal to the service priority of the first service signal, determining not to interrupt the transmission of the first service signal in the first time-frequency resource.

In an implementation, a starting position of the conflicting resource is the starting position at which the transmission of the first service signal is interrupted; and/or, an ending position of the first time-frequency resource is the ending position at which the transmission of the first service signal is interrupted.

It should be noted that after acquiring the resource indication information, the mobile terminal may detect, from the resource indication information, which signal transmission resources are currently being occupied and what types of the services occupying the signal transmission resources are. Furthermore, with this manner, a second service signal for which a corresponding time-frequency resource conflicts with the first time-frequency resource can be acquired. After the second service signal is acquired, a corresponding service priority can be queried through the service type of the second service signal. As a manner, a mapping relationship between service types and service priorities may be locally stored in the mobile terminal, then in this manner, the mobile terminal may acquire the service priority of the second service signal by querying the mapping relationship.

Figure 9:
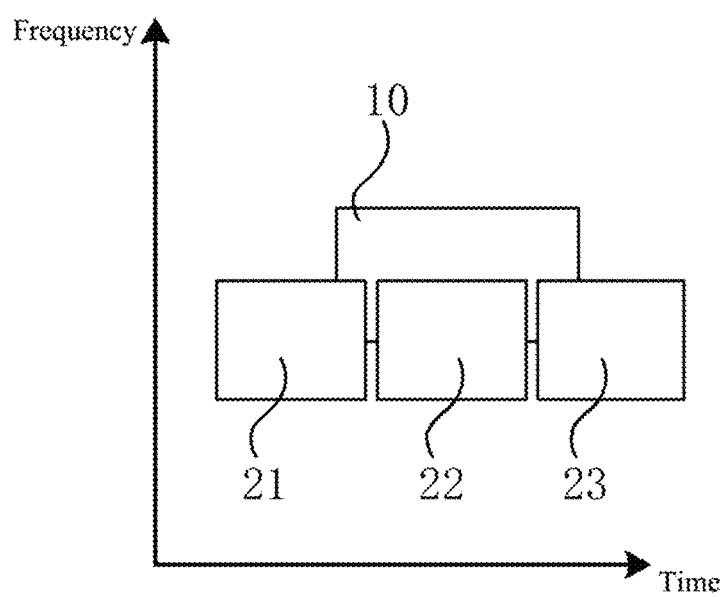
FIG. 9 shows a schematic diagram of a resource conflict in another signal transmission method proposed in an embodiment of the present application.

It should be noted that, in an embodiment of the present application, the first service signal may be a URLLC service, or may be an eMBB service. The second service signal may be a URLLC service, or may be an eMBB service. Exemplarily, as shown in FIG. 9, a conflicting resource 21, a conflicting resource 22, and a conflicting resource 23 in FIG. 9 respectively correspond to three conflicting modes between the second time-frequency resource and the first time-frequency resource. Among them, the conflicting resource 21 corresponds to a resource conflict occurring at the beginning of the transmission of the first service signal, and the conflicting resource 22 and the conflicting resource 23 correspond to resource conflicts occurring during the transmission of the first service signal, except that the conflict corresponding to the conflicting resource 22 ends at a position before the original ending position of the transmission of the first service signal. Then, in the situation shown in FIG. 9, under a circumstance that the URLLC service has a service priority higher than a service priority of the eMBB service, if the first service signal is the URLLC service and the second service signal is the eMBB service, the transmission of the first service signal will not be interrupted regardless of the conflict mode corresponding to any conflicting resource of the conflicting resource 21, the conflicting resource 22 and the conflicting resource 23; if the first service signal is the eMBB service and the second service signal is the URLLC service, the first service signal will be interrupted regardless of the conflicting mode among the conflicting resource 21, the conflicting resource 22 and the conflicting resource 23. For a specific starting position and ending position at which the transmission is interrupted, reference may be made to the content in the foregoing embodiments.

In a manner, even if the first service signal and the second service signal have a same service category, different service priorities may be configured accordingly. In this manner, in an implementation, in addition to identifying a service type of a service occupying a signal transmission resource, a device that generates the resource indication information can also identify the service occupying the signal transmission resource being performed by what kind of terminal. For example, even all services are URLLC services, they may be transmitted by a vehicle-mounted terminal device, or transmitted by a VR device. Then, in this manner, in addition to both determining the type of the second service signal and determining the second service signal being performed by what kind of terminal, the mobile terminal may further compare the type of the terminal transmitting the second service signal with its own type to determine whether to interrupt transmission of the first service signal.

With the aforementioned manner, the signal transmission method provided in the present application achieves that after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, in an embodiment of the present application, the transmission configuration information includes a service priority, thereby achieving that the starting position and/or the ending position at which the transmission of the first service signal is interrupted in the first time-frequency resource are determined according to the service priority included in the transmission configuration information and the resource indication information.

Figure 10:
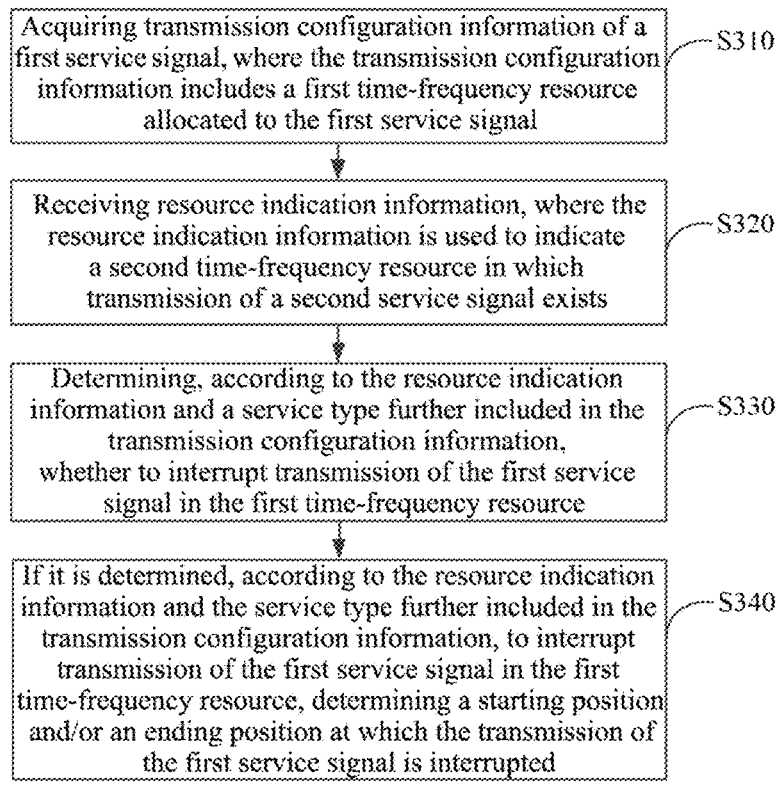
FIG. 10 shows a flowchart of yet another signal transmission method proposed in an embodiment of the present application.

Reference may be made to FIG. 10, where the present application provides a signal transmission method applied to a mobile terminal, including:

S310: acquiring transmission configuration information of a first service signal, where the transmission configuration information includes a first time-frequency resource allocated to the first service signal.

S320: receiving resource indication information, where the resource indication information is used to indicate a second time-frequency resource in which transmission of a second service signal exists.

S330: determining, according to the resource indication information and a service type further included in the transmission configuration information, whether to interrupt transmission of the first service signal in the first time-frequency resource.

S340: if it is determined, according to the resource indication information and the service type further included in the transmission configuration information, to interrupt transmission of the first service signal in the first time-frequency resource, determining a starting position and/or an ending position at which the transmission of the first service signal is interrupted.

As a manner, the determining, according to the service type and the resource indication information, whether to interrupt transmission of the first service signal in the first time-frequency resource includes:

if there is a conflicting resource between the first time-frequency resource and the second time-frequency resource, and the service type of the first service signal is an eMBB type, determining to interrupt the transmission of the first service signal in the first time-frequency resource; or, if there is no conflicting resource between the first time-frequency resource and the second time-frequency resource, or the service type of the first service signal is a URLLC type, determining not to interrupt the transmission of the first service signal in the first time-frequency resource.

In an implementation, a starting position of the conflicting resource is the starting position at which the transmission of the first service signal is interrupted; and/or, an ending position of the first time-frequency resource is the ending position at which the transmission of the first service signal is interrupted.

For the manner in which the mobile terminal acquires the second service signal and the service type of the second service signal, reference may be made to the content in the foregoing embodiments, and details will not be described here again.

With the aforementioned manner, the signal transmission method provided in the present application achieves that after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, in the present embodiment, the transmission configuration information includes at least a service type, in this way, the starting position and/or the ending position at which the transmission of the first service signal is interrupted in the first time-frequency resource are determined according to the service type included in the transmission configuration information and the resource indication information, thereby achieving that usage efficiency of signal transmission resources is improved as much as possible on the premise that signal transmission can be stably performed.

Figure 11:
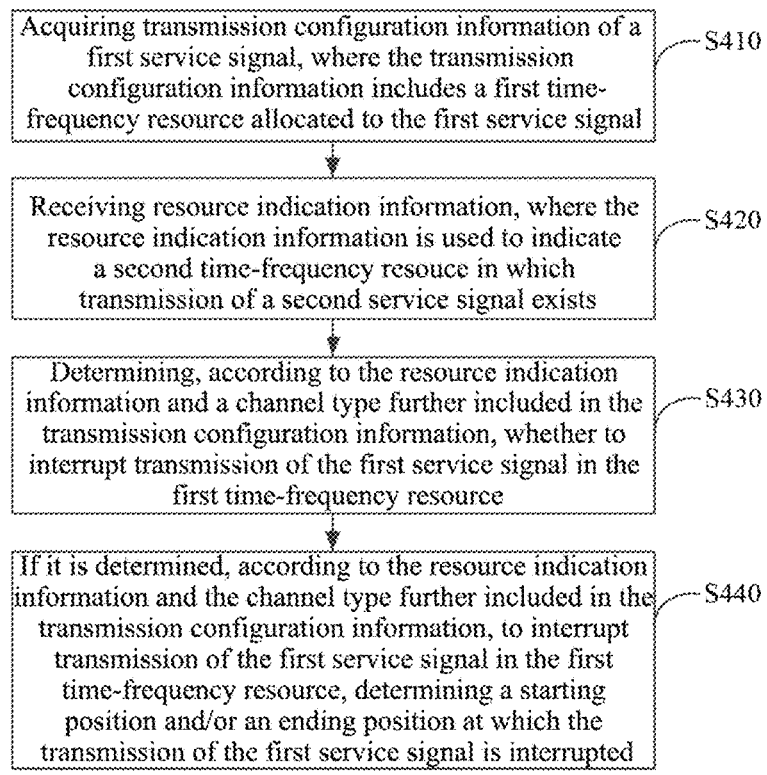
FIG. 11 shows a flowchart of still yet another signal transmission method proposed in an embodiment of the present application.

Reference may be made to FIG. 11, where the present application provides a signal transmission method applied to a mobile terminal, including:

S410: acquiring transmission configuration information of a first service signal, where the transmission configuration information includes a first time-frequency resource allocated to the first service signal.

S420: receiving resource indication information, where the resource indication information is used to indicate a second time-frequency resource in which transmission of a second service signal exists.

S430: determining, according to the resource indication information and a channel type further included in the transmission configuration information, whether to interrupt transmission of the first service signal in the first time-frequency resource.

S440: if it is determined, according to the resource indication information and the channel type further included in the transmission configuration information, to interrupt transmission of the first service signal in the first time-frequency resource, determining a starting position and/or an ending position at which the transmission of the first service signal is interrupted.

It should be noted that different service signals may be carried by different channels. As a manner, the determining, according to the channel type and the resource indication information, whether to interrupt transmission of the first service signal in the first time-frequency resource includes: if there is a conflicting resource between the first time-frequency resource and the second time-frequency resource, and the channel type of the first service signal is a PUSCH type, determining to interrupt the transmission of the first service signal in the first time-frequency resource; or, if there is no conflicting resource between the first time-frequency resource and the second time-frequency resource, or the channel type of the first service signal is a PUCCH type, determining not to interrupt the transmission of the first service signal in the first time-frequency resource.

In an implementation, a starting position of the conflicting resource is the starting position at which the transmission of the first service signal is interrupted; and/or, an ending position of the first time-frequency resource is the ending position at which the transmission of the first service signal is interrupted.

Figure 12:
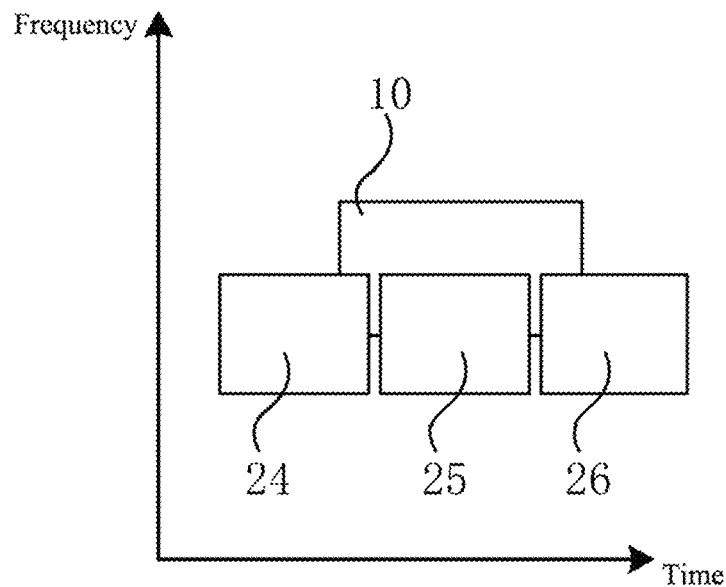
FIG. 12 shows a schematic diagram of a resource conflict in still yet another signal transmission method proposed in an embodiment of the present application.

Exemplarily, as shown in FIG. 12, a conflicting resource 24, a conflicting resource 25, and a conflicting resource 26 in FIG. 12 respectively correspond to three conflicting modes between the second time-frequency resource and the first time-frequency resource. Then, in the situation shown in FIG. 12, if the type of channel carrying the first service signal is a PUCCH type, the transmission of the first service signal will not be interrupted regardless of the conflict mode corresponding to any conflicting resource of the conflicting resource 24, the conflicting resource 25 and the conflicting resource 26; if the type of channel carrying the first service signal is a PUSCH type, the first service signal will be interrupted regardless of the conflicting mode among the conflicting resource 24, the conflicting resource 25 and the conflicting resource 26. For a specific starting position and ending position at which the transmission is interrupted, reference may be made to the content in the foregoing embodiments.

With the aforementioned manner, the signal transmission method provided in the present application achieves that after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, in the present embodiment, the transmission configuration information includes at least a channel type, in this way, the starting position and/or the ending position at which the transmission of the first service signal is interrupted in the first time-frequency resource are determined according to the channel type included in the transmission configuration information and the resource indication information, thereby achieving that usage efficiency of signal transmission resources is improved as much as possible on the premise that signal transmission can be stably performed.

Figure 13:
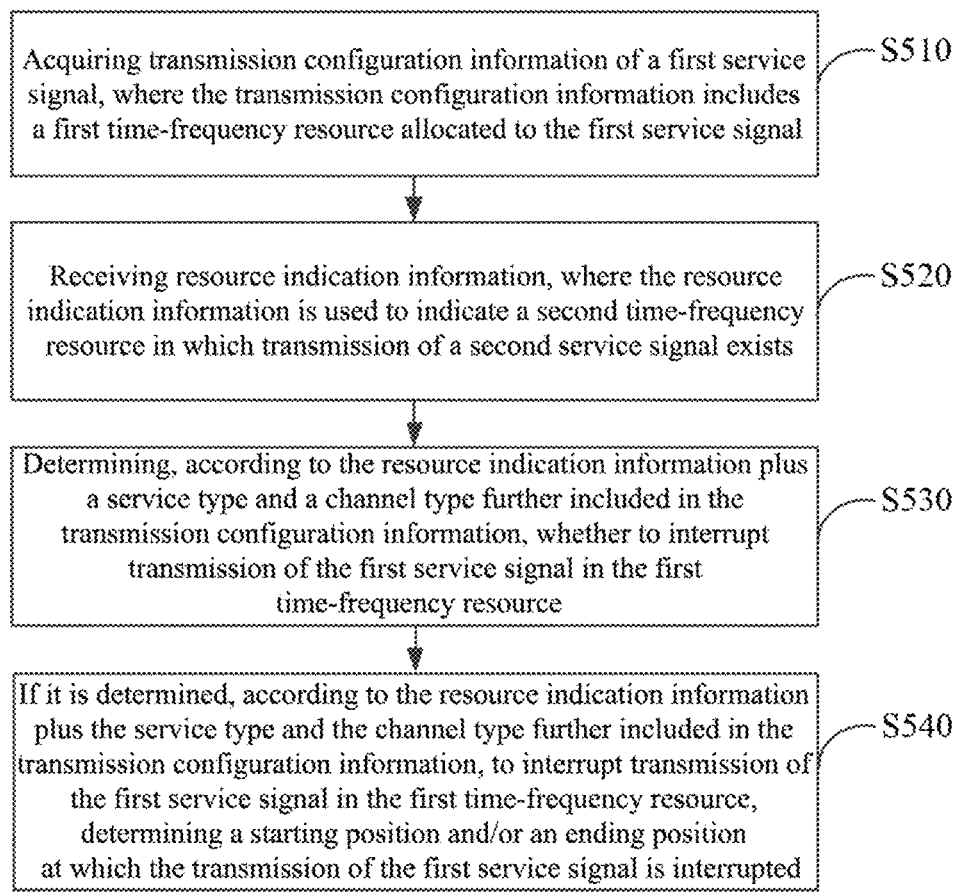
FIG. 13 shows a flowchart of still yet another signal transmission method proposed in an embodiment of the present application.

Reference may be made to FIG. 13, where the present application provides a signal transmission method applied to a mobile terminal, including:

S510: acquiring transmission configuration information of a first service signal, where the transmission configuration information includes a first time-frequency resource allocated to the first service signal.

S520: receiving resource indication information, where the resource indication information is used to indicate a second time-frequency resource in which transmission of a second service signal exists.

S530: determining, according to the resource indication information plus a service type and a channel type further included in the transmission configuration information, whether to interrupt transmission of the first service signal in the first time-frequency resource.

S540: if it is determined, according to the resource indication information plus the service type and the channel type further included in the transmission configuration infor-mation, to interrupt transmission of the first service signal in the first time-frequency resource, determining a starting position and/or an ending position at which the transmission of the first service signal is interrupted.

As a manner, the determining, according to the service type, the channel type and the resource indication information, whether to interrupt transmission of the first service signal in the first time-frequency resource includes: if there is a conflicting resource between the first time-frequency resource and the second time-frequency resource, and the service type of the first service signal is an eMBB type and the channel type of the first service signal is a PUSCH type, determining to interrupt the transmission of the first service signal in the first time-frequency resource; or, if there is no conflicting resource between the first time-frequency resource and the second time-frequency resource, or the service type of the first service signal is a URLLC type, or the channel type of the first service signal is a PUCCH type, determining not to interrupt the transmission of the first service signal in the first time-frequency resource.

In an implementation, a starting position of the conflicting resource is the starting position at which the transmission of the first service signal is interrupted; and/or, an ending position of the first time-frequency resource is the ending position at which the transmission of the first service signal is interrupted.

With the aforementioned manner, the signal transmission method provided in the present application achieves that after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, in the present embodiment, the transmission configuration information includes at least a service type and a channel type, in this way, the starting position and/or the ending position at which the transmission of the first service signal is interrupted in the first time-frequency resource are determined according to the service type and the channel type included in the transmission configuration information in conjunction with the resource indication information, thereby achieving that usage efficiency of signal transmission resources is improved as much as possible on the premise that signal transmission can be stably performed.

Figure 14:
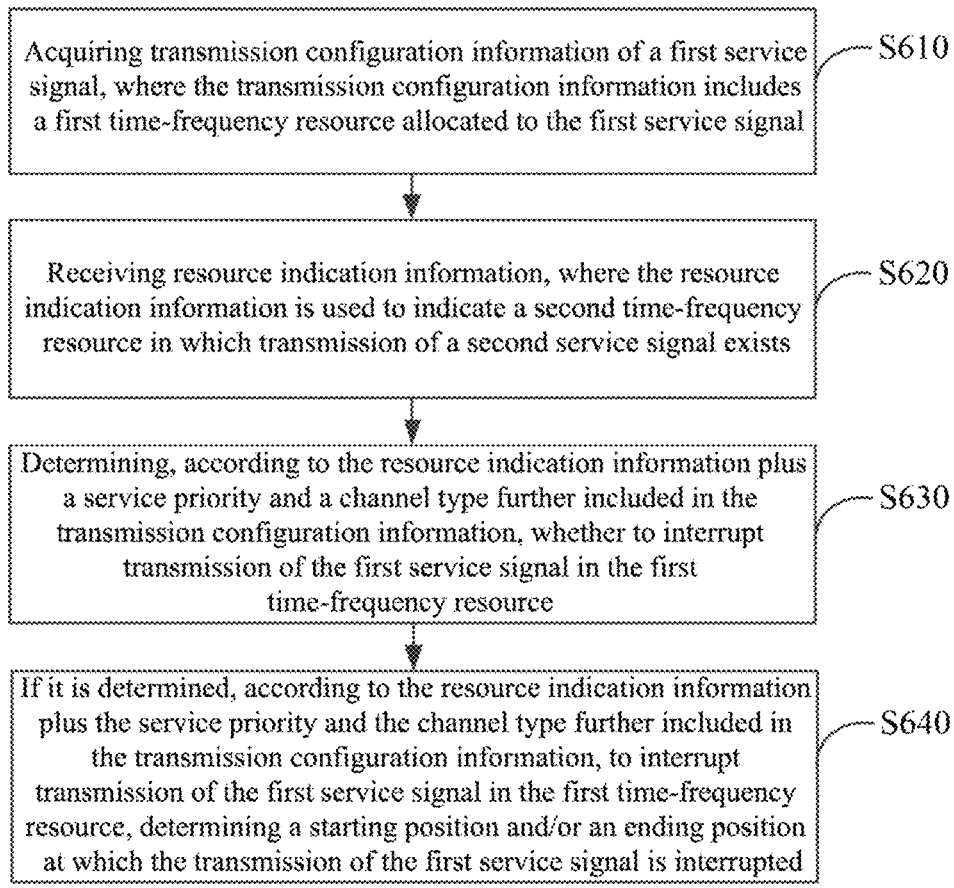
FIG. 14 shows a flowchart of still yet another signal transmission method proposed in an embodiment of the present application.

Reference may be made to FIG. 14, where the present application provides a signal transmission method applied to a mobile terminal, including:

S610: acquiring transmission configuration information of a first service signal, where the transmission configuration information includes a first time-frequency resource allocated to the first service signal.

S620: receiving resource indication information, where the resource indication information is used to indicate a second time-frequency resource in which transmission of a second service signal exists.

S630: determining, according to the resource indication information plus a service priority and a channel type further included in the transmission configuration information, whether to interrupt transmission of the first service signal in the first time-frequency resource.

S640: if it is determined, according to the resource indication information plus the service priority and the channel type further included in the transmission configuration information, to interrupt transmission of the first service signal in the first time-frequency resource, determining a starting position and/or an ending position at which the transmission of the first service signal is interrupted.

As a manner, the determining, according to the service priority, the channel type and the resource indication information, whether to interrupt transmission of the first service signal in the first time-frequency resource includes:

if there is a conflicting resource between the first time-frequency resource and the second time-frequency resource, and the service priority of the first service signal is lower than a service priority of the second service signal and the channel type of the first service signal is a PUSCH type, determining to interrupt the transmission of the first service signal in the first time-frequency resource; or, if there is no conflicting resource between the first time-frequency resource and the second time-frequency resource, or the service priority of the first service signal is not lower than a service priority of the second service signal, or the channel type of the first service signal is a PUCCH type, determining not to interrupt the transmission of the first service signal in the first time-frequency resource.

In an implementation, a starting position of the conflicting resource is the starting position at which the transmission of the first service signal is interrupted; and/or, an ending position of the first time-frequency resource is the ending position at which the transmission of the first service signal is interrupted.

With the aforementioned manner, the signal transmission method provided in the present application achieves that after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, in the present embodiment, the transmission configuration information includes at least a service priority and a channel type, in this way, the starting position and/or the ending position at which the transmission of the first service signal is interrupted in the first time-frequency resource are determined according to the service priority and the channel type included in the transmission configuration information in conjunction with the resource indication information, thereby achieving that usage efficiency of signal transmission resources is improved as much as possible on the premise that signal transmission can be stably performed.

Figure 15:
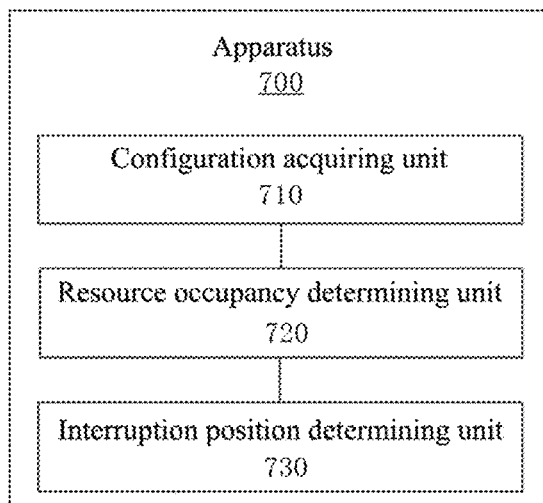
FIG. 15 shows a structural block diagram of a signal transmission apparatus proposed in an embodiment of the present application.

Reference may be made to FIG. 15, where a signal transmission apparatus 700 provided in the present application includes:

a configuration acquiring unit 710, configured to acquire transmission configuration information of a first service signal, where the transmission configuration information includes a first time-frequency resource allocated to the first service signal;

a resource occupancy determining unit 720, configured to receive resource indication information, where the resource indication information is used to indicate a second time-frequency resource in which transmission of a second service signal exists; and an interruption position determining unit 730, configured to: if it is determined, according to the transmission configuration information and the resource indication information, to interrupt transmission of the first service signal in the first time-frequency resource, determining a starting position and/or an ending position at which the transmission of the first service signal is interrupted.

As a manner, the transmission configuration information includes at least one of a service priority, a service type, and a channel type.

In a manner, the transmission configuration information further includes a service priority. The interruption position determining unit 730 is specifically configured to: determine, according to the transmission configuration information and the resource indication information, whether to interrupt transmission of the first service signal in the first time-frequency resource; and determine the starting position and/or the ending position at which the transmission of the first service signal is interrupted in the first time-frequency resource, when it is determined that the transmission of the first service signal needs to be interrupted. In this manner, in an implementation, the interruption position determining unit 730 is specifically configured to determine, according to the service priority and the resource indication information, whether to interrupt transmission of the first service signal in the first time-frequency resource.

In this manner, the interruption position determining unit 730 is specifically configured to: if there is a conflicting resource between the first time-frequency resource and the second time-frequency resource, and the second service signal has a service priority higher than the service priority of the first service signal, determine to interrupt the transmission of the first service signal in the first time-frequency resource; or, if there is no conflicting resource between the first time-frequency resource and the second time-frequency resource, or the second service signal has a service priority lower than or equal to the service priority of the first service signal, determine not to interrupt the transmission of the first service signal in the first time-frequency resource.

In a manner, the transmission configuration information further includes a service type. In this manner, the interruption position determining unit 730 is specifically configured to determine, according to the service type and the resource indication information, whether to interrupt transmission of the first service signal in the first time-frequency resource. In this manner, the interruption position determining unit 730 is specifically configured to: if there is a conflicting resource between the first time-frequency resource and the second time-frequency resource, and the service type of the first service signal is an eMBB type, determine to interrupt the transmission of the first service signal in the first time-frequency resource; or, if there is no conflicting resource between the first time-frequency resource and the second time-frequency resource, or the service type of the first service signal is a URLLC type, determine not to interrupt the transmission of the first service signal in the first time-frequency resource.

In a manner, the transmission configuration information includes a channel type. In this manner, the interruption position determining unit 730 is specifically configured to determine, according to the channel type and the resource indication information, whether to interrupt transmission of the first service signal in the first time-frequency resource. Among them, in an implementation, the interruption position determining unit 730 is specifically configured to: if there is a conflicting resource between the first time-frequency resource and the second time-frequency resource, and the channel type of the first service signal is a PUSCH type, determine to interrupt the transmission of the first service signal in the first time-frequency resource; or, if there is no conflicting resource between the first time-frequency resource and the second time-frequency resource, or the channel type of the first service signal is a PUCCH type, determine not to interrupt the transmission of the first service signal in the first time-frequency resource.

In a manner, the transmission configuration information further includes at least a service type and a channel type. In this manner, the interruption position determining unit 730 is specifically configured to determine, according to the service type, the channel type and the resource indication information, whether to interrupt transmission of the first service signal in the first time-frequency resource. Among them, in an implementation, the interruption position determining unit 730 is specifically configured to: if there is a conflicting resource between the first time-frequency resource and the second time-frequency resource, and the service type of the first service signal is an eMBB type and the channel type of the first service signal is a PUSCH type, determine to interrupt the transmission of the first service signal in the first time-frequency resource; or, if there is no conflicting resource between the first time-frequency resource and the second time-frequency resource, or the service type of the first service signal is a URLLC type, or the channel type of the first service signal is a PUCCH type, determine not to interrupt the transmission of the first service signal in the first time-frequency resource.

In a manner, the transmission configuration information further includes at least a service priority and a channel type. The interruption position determining unit 730 is specifically configured to determine, according to the service priority, the channel type and the resource indication information, whether to interrupt transmission of the first service signal in the first time-frequency resource. Among them, in an implementation, the interruption position determining unit 730 is specifically configured to: if there is a conflicting resource between the first time-frequency resource and the second time-frequency resource, and the service priority of the first service signal is lower than a service priority of the second service signal and the channel type of the first service signal is a PUSCH type, determine to interrupt the transmission of the first service signal in the first time-frequency resource; or, if there is no conflicting resource between the first time-frequency resource and the second time-frequency resource, or the service priority of the first service signal is not lower than a service priority of the second service signal, or the channel type of the first service signal is a PUCCH type, determine not to interrupt the transmission of the first service signal in the first time-frequency resource.

Figure 16:
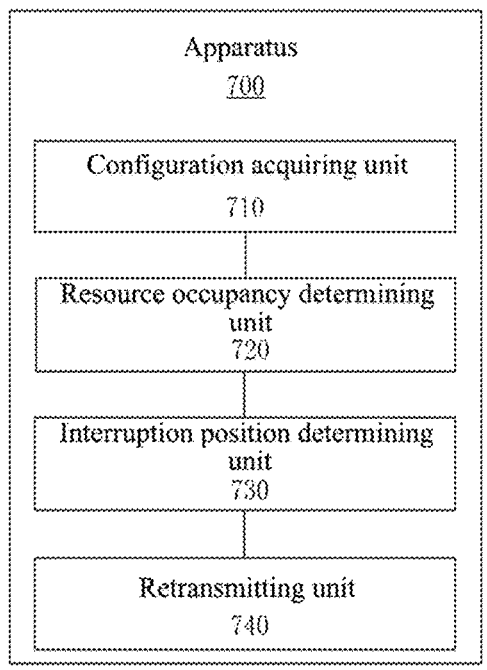
FIG. 16 shows a structural block diagram of yet another signal transmission apparatus proposed in an embodiment of the present application.

As shown in FIG. 16, the apparatus 700 further includes:

a retransmitting unit 740, configured to: if a transmission-interrupted service signal corresponding to the first service signal is not decoded successfully, retransmit the transmission-interrupted service signal.

It should be noted that, it may be clearly understood by a person skilled in the art that, for the purpose of convenient and brief description, reference may be made to corresponding processes in the foregoing method embodiments for detailed operating processes of the foregoing apparatuses and units, and details will not be described here again. In several embodiments provided in the present application, coupling between modules may be a coupling in electronic, mechanical, or other forms. In addition, various functional modules in various embodiments of the present application may be integrated into one processing module, or each of the modules may exist alone physically, or two or more modules are integrated into one module. The integrated module may be implemented in a form of hardware, or may be implemented in a form of a software functional module.

Hereinafter, description will be made to an electronic device provided in the present application in conjunction with FIG. 17.

Figure 17:
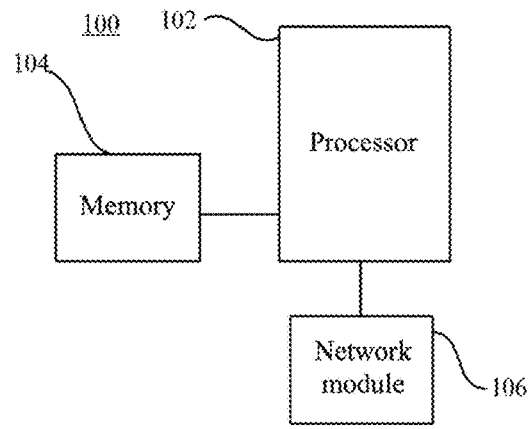
FIG. 17 shows a structural block diagram of a mobile terminal proposed in the present application.

Reference may be made to FIG. 17, based on the foregoing signal transmission method and apparatus, an embodiment of the present application further provides another mobile terminal 100 that can execute the foregoing signal transmission method. The mobile terminal 100 includes one or more (only one shown in the figure) processors 102, memories 104 and network modules 106 coupled to each other. Among them, the memory 104 has stored therein a program that can execute the content in the foregoing embodiment, and the processor 102 can execute the program stored in the memory 104.

The processor 102 may include one or more processing cores. The processor 102 utilizes various interfaces and lines to connect various parts of the entire mobile terminal 100, and executes various functions and processing data of the mobile terminal 100 by running or executing an instruction, a program, a set of codes or a set of instructions stored in the memory 104 and calling data stored in the memory 104. In an implementation, the processor 102 may be implemented using at least one hardware form among a digital signal processor (Digital Signal Processor, DSP), a field-programmable gate array (Field-Programmable Gate Array, FPGA), and a programmable logic array (Programmable Logic Array, PLA). The processor 102 may integrates with one or a combination of several of a central processing unit (Central Processing Unit, CPU), a graphics processing unit (Graphics Processing Unit, GPU), a modem and others. Among them, the CPU mainly processes an operating system, a user interface, and a target application program, etc.; the GPU is configured to be responsible for rendering and drawing displayed content; the modem is configured to process wireless communications. It is understandable that the aforementioned modem may not be integrated into the processor 102, but may be implemented by a communication chip alone.

The memory 104 may include a random access memory (Random Access Memory, RAM), or may include a read-only memory (Read-Only Memory). The memory 104 may be configured to store an instruction, a program, a code, a set of codes or a set of instructions. The memory 104 may include a program storage area and a data storage area, among them, the program storage area is able to store an instruction for implementing the operating system, an instruction for implementing at least one function (such as a touch function, a sound play function, and an image play function, etc.), and an instruction for implementing the accompanying method embodiments, etc. The data storage area is also able to store data (such as a phone book, audio and video data, chat record data) created during use of the mobile terminal 100, and the like.

The network module 106 is configured to receive and transmit an electromagnetic wave to achieve a mutual conversion between the electromagnetic wave and an electrical signal, thereby performing communications with a communication network or a further device, such as performing communications with an audio play device. The network module 106 may include various existing circuit elements for executing these functions, for example, an antenna, a radio frequency transceiver, a digital signal processor, an encryption/decryption chip, a subscriber identity module (SIM) card, a memory, etc. The network module 106 may communicate with various networks such as Internet, an intranet and a wireless network, or communicate with a further electronic device via a wireless network. The aforementioned wireless network may include a cellular telephone network, a wireless local area network, or a metropolitan area network. The aforementioned wireless network may use various communication standards, protocols and technologies, even including those protocols that have not yet been developed.

Figure 18:
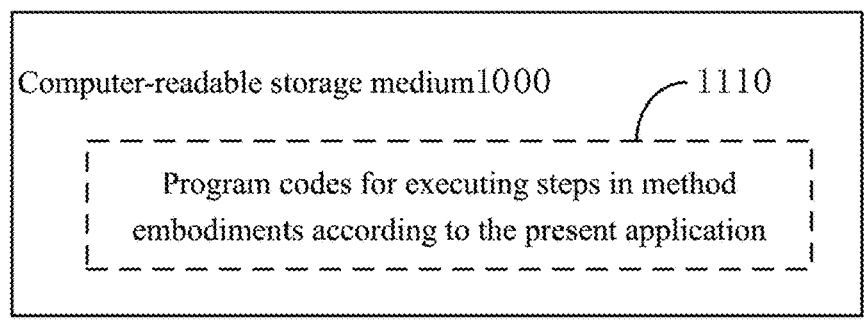
FIG. 18 shows a structural block diagram of a mobile terminal of the present application for executing a signal transmission method according to an embodiment of the present application.

Reference may be made to FIG. 18, which shows a structural block diagram of a computer-readable storage medium provided in an embodiment of the present application. The computer-readable storage medium 1000 has stored therein a program code, and the program code can be called by a processor to execute the method described in the aforementioned method embodiments.

The computer-readable storage medium 1000 may be an electronic memory such as a flash memory, an EEPROM (electrically erasable programmable read only memory), a EPROM (erasable programmable read only memory), a hard disk, an ROM, or the like. In an implementation, the computer-readable storage medium 1000 includes a non-transitory computer-readable storage medium. The computer-readable storage medium 1000 has a storage space for program codes 1110 for executing any method step in the aforementioned methods. These program codes can be read out from or written into one or more computer program products. The program codes 1110 may be compressed in a proper form, for example.

With regard to the specification, the "computer-readable medium" may be any apparatus that may contain, store, communicate, propagate, or transmit programs for use with instruction execution systems, apparatuses or devices, or for use in conjunction with these instruction execution systems, apparatuses or devices. More specific examples (a non-exhaustive list) of the computer-readable medium include: an electrically connectable portion (an electric device) having one or more wires, a portable computer diskette (a magnetic apparatus), a random access memory (RAM), a read only memory (ROM), an erasable programmable read only memory (EPROM), an optic fiber apparatus, and a portable compact disk read only memory (CDROM). In addition, the computer-readable medium even may be a paper or other suitable medium on which the program can be printed, since the program can be derived electronically, for example, by optically scanning, the paper or other medium, followed by editing, decoding, or processing otherwise properly if necessary, and then be stored in a computer memory.

In conclusion, the signal transmission method and apparatus, the mobile terminal, and the storage medium provided in the present application can allow for: acquiring transmission configuration information of a first service signal, where the transmission configuration information includes a first time-frequency resource allocated to the first service signal; and then when receiving resource indication information representing occupancy of a signal transmission resource by a device other than the mobile terminal, if it is determined, according to the transmission configuration information and the resource indication information, to interrupt transmission of the first service signal in the first time-frequency resource, determining a starting position and/or an ending position at which the transmission of the first service signal is interrupted. With the aforementioned manner, it is achieved that, after the first time-frequency resource of the first service signal to be transmitted is acquired, the starting position and/or the ending position at which the transmission of the first service signal is interrupted in the first time-frequency resource can be further determined according to the received resource indication information, thereby achieving that usage efficiency of signal transmission resources is improved as much as possible on the premise that signal transmission can be stably performed. Moreover, since the signal transmission method provided in the present application is operating on the terminal side, there is no need to make any logical change at a peer side in communication with the terminal side, thereby reducing implementation costs of the overall scheme.

Finally, it should be noted that the foregoing embodiments are merely intended for illustrating technical solutions of the present application rather than limiting the present application. Although the present application has been described in detail with reference to the foregoing embodiments, those of ordinary skill in the art should understand that they may still make modifications to the technical solutions described in the foregoing embodiments, or make equivalent replacements to some technical features therein; however, these modifications or replacements do not make the essence of the corresponding technical solutions depart from the spirit and scope of the technical solutions in the embodiments of the present application.

What is claimed is:

1. A signal transmission method applied to a mobile terminal, comprising:
    acquiring transmission configuration information of a first service signal, wherein the transmission configuration information comprises a first time-frequency resource allocated to the first service signal;
    receiving resource indication information, wherein the resource indication information is used to indicate that there is a second time-frequency resource for transmission of a second service signal; and
    if it is determined, according to the transmission configuration information and the resource indication information, to interrupt transmission of the first service signal in the first time-frequency resource, determining at least one of a starting position and an ending position at which the transmission of the first service signal is interrupted;
    wherein the method further comprising: determining, according to the transmission configuration information and the resource indication information, whether to interrupt transmission of the first service signal in the first time-frequency resource;
    wherein the transmission configuration information further comprises a service priority;
    wherein the determining, according to the transmission configuration information and the resource indication information, whether to interrupt transmission of the first service signal in the first time-frequency resource comprises: determining, according to the service priority and the resource indication information, whether to interrupt transmission of the first service signal in the first time-frequency resource;
    wherein the determining, according to the service priority and the resource indication
        information, whether to interrupt transmission of the first service signal in the first time-frequency resource comprises:
        if there is a conflicting resource between the first time-frequency resource and the second time-frequency resource, and the second service signal has a service priority higher than the service priority of the first service signal, determining to interrupt the transmission of the first service signal in the first time-frequency resource;

or if there is no conflicting resource between the first time-frequency resource and the second time-frequency resource, or the second service signal has a service priority lower than or equal to the service priority of the first service signal, determining not to interrupt the transmission of the first service signal in the first time-frequency resource;

wherein a starting position of the conflicting resource is the starting position at which the transmission of the first service signal is interrupted; or, an ending position of the first time-frequency resource is the ending position at which the transmission of the first service signal is interrupted; or, a starting position of the conflicting resource is the starting position at which the transmission of the first service signal is interrupted and an ending position of the first time-frequency resource is the ending position at which the transmission of the first service signal is interrupted.

2. A mobile terminal, comprising: one or more processors and a memory;

wherein one or more programs are stored in the memory and configured to be executable by the one or more processors, and the one or more processors, when executing the one or more programs, are configured to:

acquire transmission configuration information of a first service signal, wherein the transmission configuration information comprises a first time-frequency resource allocated to the first service signal;

receive resource indication information, wherein the resource indication information is used to indicate that there is a second time-frequency resource for transmission of a second service signal; and if it is determined, according to the transmission configuration information and the resource indication information, to interrupt transmission of the first service signal in the first time-frequency resource, determine at least one of a starting position and an ending position at which the transmission of the first service signal is interrupted;

wherein the one or more processors are further configured to: determine, according to the transmission configuration information and the resource indication information, whether to interrupt transmission of the first service signal in the first time-frequency resource;

wherein the transmission configuration information further comprises a service priority;

wherein the one or more processors are further configured to: determine, according to the service priority and the resource indication information, whether to interrupt transmission of the first service signal in the first time-frequency resource;

wherein the one or more processors are further configured to:

if there is a conflicting resource between the first time-frequency resource and the second time-frequency resource, and the second service signal has a service priority higher than the service priority of the first service signal, determine to interrupt the transmission of the first service signal in the first time-frequency resource;

or, if there is no conflicting resource between the first time-frequency resource and the second time-frequency resource, or the second service signal has a service priority lower than or equal to the service priority of the first service signal, determine not to interrupt the transmission of the first service signal in the first time-frequency resource;

wherein a starting position of the conflicting resource is the starting position at which the transmission of the first service signal is interrupted; or, an ending position of the first time-frequency resource is the ending position at which the transmission of the first service signal is interrupted; or, a starting position of the conflicting resource is the starting position at which the transmission of the first service signal is interrupted and an ending position of the first time-frequency resource is the ending position at which the transmission of the first service signal is interrupted.

3. A non-transitory computer-readable storage medium, comprising: a program that is stored, wherein the program, when executed by a processor, causes the processor to:

acquire transmission configuration information of a first service signal, wherein the transmission configuration information comprises a first time-frequency resource allocated to the first service signal;

receive resource indication information, wherein the resource indication information is used to indicate that there is a second time-frequency resource for transmission of a second service signal; and if it is determined, according to the transmission configuration information and the resource indication information, to interrupt transmission of the first service signal in the first time-frequency resource, determine at least one of a starting position and an ending position at which the transmission of the first service signal is interrupted;

wherein the program, when executed by a processor, causes the processor to: determine, according to the transmission configuration information and the resource indication information, whether to interrupt transmission of the first service signal in the first time-frequency resource;

wherein the transmission configuration information further comprises a service priority;

wherein the program, when executed by a processor, causes the processor to: determine, according to the service priority and the resource indication information, whether to interrupt transmission of the first service signal in the first time-frequency resource;

wherein the program, when executed by a processor, causes the processor to:

if there is a conflicting resource between the first time-frequency resource and the second time-frequency resource, and the second service signal has a service priority higher than the service priority of the first service signal, determine to interrupt the transmission of the first service signal in the first time-frequency resource;

or, if there is no conflicting resource between the first time-frequency resource and the second time-frequency resource, or the second service signal has a service priority lower than or equal to the service priority of the first service signal, determine not to interrupt the transmission of the first service signal in the first time-frequency resource;

wherein a starting position of the conflicting resource is the starting position at which the transmission of the first service signal is interrupted; or, an ending position of the first time-frequency resource is the ending position at which the transmission of the first service signal is interrupted; or, a starting position of the conflicting resource is the starting position at which the transmission of the first service signal is interrupted and an ending position of the first time-frequency resource is the ending position at which the transmission of the first service signal is interrupted.

* * * * *